Figure 1:
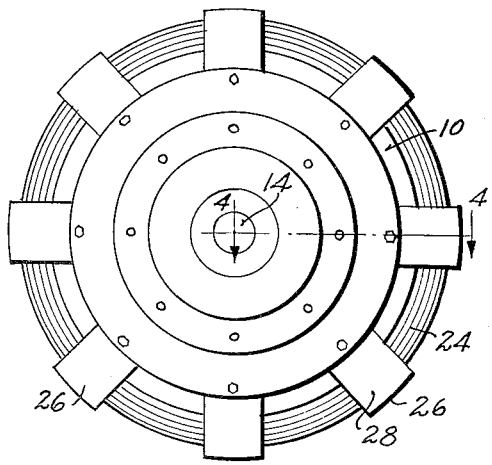

July 12, 1955 — D. S. TOFFOLO — 2,713,128

DYNAMOELECTRIC MACHINE

Filed Oct. 7, 1952

INVENTOR:
DOMINIC S. TOFFOLO
BY Bryant & Lowry
ATTORNEYS.

United States Patent Office 2,713,128
Patented July 12, 1955

2,713,128
DYNAMOELECTRIC MACHINE

Dominic S. Toffolo, Camp Springs, Md.

Application October 7, 1952, Serial No. 313,489

8 Claims. (Cl. 310—180)

This invention pertains to dynamoelectric machines, and particularly to arrangements for controlling the airgap flux in such machines.

Conventional dynamoelectric machines, such as motors and generators, are provided with some arrangement for producing a magnetic flux together with means for causing one or more conductors to cut this flux, thereby generating either an output current, or in the case of a motor, producing rotation or movement. The flux in any particular case may be obtained in different ways, such as by the use of field pole pieces carrying windings energized by a current, or by the use of permanent magnets. Control of the output, electrical in the case of a generator or mechanical in the case of a motor, has been obtained as by varying the current in the field coil conductors, or by mechanically changing the airgap dimension, by altering the reluctance of the magnetic path, or the like.

It is a principal object of this invention to provide a novel way in which the effective reluctance of the airgap flux in such machines may be controlled by relatively small currents.

A further object of the invention is to provide a novel dynamoelectric machine in which the airgap flux can readily be controlled at will without the use of added moving mechanical parts, and in which a relatively small control current can control the effective reluctance of the airgap of the machine, either for control of output current or voltage, in the case of a generator, or for control of the mechanical output, torque or the like in the case of a motor.

A particularly valuable application of my invention lies in the field of controlling the output voltage and/or current of a type of alternating current generator whose magnetic field is produced by the use of permanent magnets. Such alternators have many advantages, in that for example no field exciting source is required, and in the case in which the permanent magnets are carried by the rotor of the machine, the generated current can be led to a utilization circuit without requiring the use of slip-rings or the like. Permanent magnet alternators of this type are relatively small as compared with other types, and have therefore been the subject of considerable development for aircraft use. However, since the magnetomotive force produced by the permanent magnets is fixed by the design of the machine, and since any change in speed at which the device is driven produces changes both in voltage and frequency, the use of machines of this type has required auxiliary control equipment which detracts considerably from the value of the device.

It is accordingly a further object of my invention to provide a design of permanent magnet alternating current generator in which the output voltage and current can readily be controlled by purely electrical means of very simple construction. More particularly, I achieve this result by providing an auxiliary control flux which intersects the normally constant flux produced by the permanent magnets, and controlling the magnitude of the control flux by altering the current which produces the same.

A further object of my invention is to provide an arrangement of the kind just described in which the control current, which produces the auxiliary control flux, can readily be obtained from the output of the alternator itself, so that no separate current supply is required. Since the control flux will ordinarily be a direct-current flux, the alternator output (or, rather, a portion thereof) can readily be rectified to supply the current for the control winding.

Figure 3:
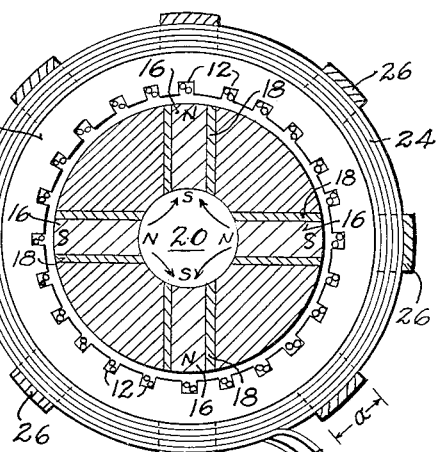
Figure 2:
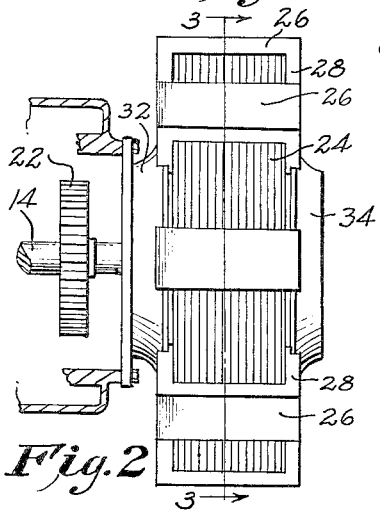
Figure 4:
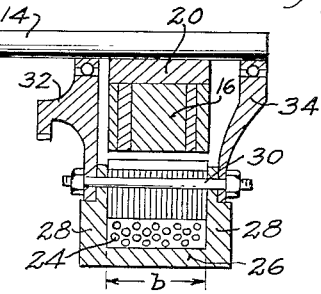
Figure 5:
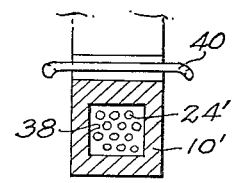
Figure 6:
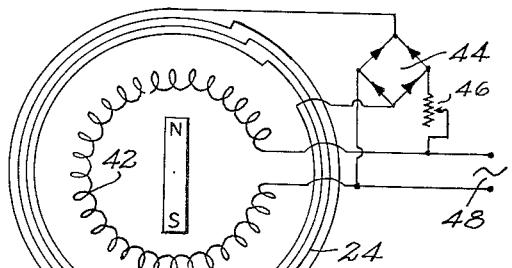
Figure 7:
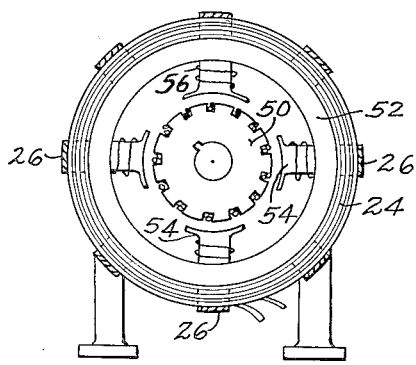

The above and other objects and advantages of my invention will best be understood by referring to the following detailed specification of certain preferred embodiments thereof, given by way of example, and to the accompanying drawings, in which:

Fig. 1 is a side view of one form of permanent magnet alternator embodying the invention, Fig. 2 is an end view of the same, parts being broken away, Fig. 3 is a sectional view taken on line 3—3 of Fig. 2, Fig. 4 is a fragmentary sectional view taken on line 4—4 of Fig. 1, Fig. 5 is a fragmentary view similar to Fig. 4 but illustrating a modified form of the invention, Fig. 6 is a wiring diagram showing the electrical connections, and Fig. 7 is a view similar to Fig. 3 but showing a further modification of the invention.

The direction of the field flux in usual dynamoelectric machines is radial across the airgap space; that is, radial to the axis of the rotor. The flux passes across the airgap, and the conductors which cut the flux, and returns through the stator structure, in the case of a permanent magnet rotor. I have found that the effectiveness of this airgap flux can be controlled by varying the reluctance of the stator portions of the flux path, by producing in the stator a control flux which is directed in a direction parallel to the axis of the rotor, that is, perpendicular to the main flux direction in the stator structure. The control flux is produced by a control winding which may conveniently be wound on the outside of the stator, so that its turns lie in effect in planes perpendicular to the rotor axis.

Referring now to Figs. 1 to 4 of the drawings, there is shown a permanent magnet alternating current generator having a stator 10 of ring-shaped configuration, and which is preferably built up from stampings or laminations of magnetically permeable material, such as iron or ordinary grades of steel as used in dynamoelectric machines. This stator 10 is provided with the usual slots 12 which accommodate the stator winding, and which are connected to the external circuit, the details of the winding arrangement being well known in this art and therefore omitted from this description.

The rotor element of this form of the invention is carried by a shaft 14, and comprises for example a set of four permanent magnets 16, which may be arranged ninety degrees apart, with the north and south poles alternating in the manner shown in Fig. 3. Each magnet 16 is preferably enclosed in an iron sheath 18 as is well known for stabilizing the magnets, and the whole is cast into the cylindrical form shown in a matrix of aluminum or other non-magnetic material. A central iron cylinder 20 forms a return path or core within the rotor, the magnetic lines taking the directions indicated by arrows. The shaft 14 may be driven by any suitable means, indicated schematically by a gear 22 in Fig. 2. The construction so far described is conventional in permanent magnet alternator construction.

In accordance with the invention, I provide a control winding 24 which may be wound about the outside of the stator 10, the outer surface of the stator forming a base for this winding, which is therefore of generally helical form. Around this winding are placed a plurality of U-shaped yoke elements 26, the number being dependent upon the design of the machine. The yoke elements are made of magnetic material such as iron, and they may either be solid or of laminated construction. The leg portions 28 of each yoke embrace the winding 24, and terminate in contact with the side faces of the stator element 10 as shown in Fig. 4. Bolts such as 30 may secure the yoke legs to the stator, and may also secure the parts with respect to end bells such as 32, 34 or other housing elements. The leads for the winding 24 are shown in Fig. 3 at 36. It is important that the circumferential dimension "a" (Fig. 3) of the yokes be smaller than the axial length "b" (Fig. 4) of the stator 10.

Passage of a current through winding 24 establishes in the stator structure a magnetic flux directed along directions parallel to the axis of the rotor. The flux set up by the permanent magnets 16 crosses the airgap from the north poles and travel circumferentially around the stator 10 until it reaches the opposite poles at which it crosses the airgap again. Consequently a large part of the equivalent ampere turns of the permanent magnets is required to drive the flux across the airgaps, and a much smaller part to drive the flux across or through the permeable material of the stator stack. The control coil 24 sets up a flux which travels around the U-shaped yoke elements 26 and through the stator in the axial direction, or at right angles to the flux in the stator due to the permanent magnets 16. Thus, through parts of the stator, both fluxes pass, and the control flux due to winding 24 will cause the permanent magnet flux to shift. A part will be forced in a helical path around the U-shaped yokes 26; a part will be forced into the air as leakage flux. The net effect is to introduce an equivalent air gap into the reluctance path of the permanent magnet field flux. This may be accomplished without the so-called saturation effect, and depends solely upon the relative strengths of the magnetomotive forces of the control winding 24 and of the permanent magnets 16, in the volume of the stator element in which the two magnetomotive forces are in conflict.

It follows that the field flux due to control winding 24 will markedly affect the net airgap flux between rotor and stator, and the terminal voltage of the machine can thus be readily controlled, and likewise its power output. If the machine is a motor, the mechanical power output, speed and torque can equally well be controlled.

Fig. 5 illustrates a modification in which the control winding 24' is situated within the stator structure 10', which may have a passageway 38 circumferentially disposed therein to accommodate the winding. This modification dispenses with the need for the yoke elements of the previous form. Numeral 40 in Fig. 5 represents one stator conductor lying in a stator slot.

Fig. 6 is a schematic diagram of the parts of the device and their electrical connections. The stator winding is designated by 42, and the rotor is shown as a permanent magnet therein. The control winding 24 in this case is shown as connected to the output of the winding 42 through a rectifier 44, which may be a dry disc rectifier. A resistor or rheostat 46 may be employed to adjust and control the current in winding 24, and hence to control the effective airgap flux of the permanent magnet rotor. Output terminals for the electrical output of the machine are indicated at 48.

Fig. 7 of the drawings shows a modified form of machine in which a wound rotor 50 is used in place of a permanent magnet rotor. The stator structure in this case is designated 52, and has salient field poles 54 each carrying the usual field winding 56, the connections being well known in this art. The control winding 24 is again shown as surrounding the outer surface of the stator body, and yoke elements 26 are provided as in the embodiments of Figs. 1 to 4. In this case also, control of the airgap flux is achieved, it being immaterial whether the normal airgap flux is derived from permanent magnets or from electromagnets as shown in Fig. 7.

While Fig. 6 shows the control current as derived from a rectifier energized by the alternating current output of the machine, it is obvious that if the machine is a direct current generator, a portion of the output may be applied to the control winding without requiring rectification.

The use of the output voltage of the machine itself as a source for the control winding is not merely convenient, but also provides a degree of self-regulation. Thus, if the output voltage should increase due to an increase in shaft speed caused by a change in the prime mover or by a change in load, the current in the control winding 24 will increase, thereby increasing the reluctance of the permanent magnet field flux path, and consequently a reduction in terminal voltage will result until it returns to its equilibrium value. If the terminal voltage decreases, the reverse effect will occur and will tend to raise the terminal voltage back to its original value.

It may also be noted that if the control winding 24 is energized by an outside source, independent control of the terminal voltage may be achieved. It is even possible to modulate the alternating current output of the machine by exciting the winding 24 with a different alternating current source; since the field flux directions are perpendicular, there is substantially zero inductive coupling between the windings.

The invention has been described herein in considerable detail by way of example, but it is to be understood that many changes and variations can be accomplished therein without departing from the spirit of my invention as defined in the appended claims.

I claim:

1. A dynamoelectric machine comprising a stator element, a rotor element mounted for rotation in said stator element and dimensioned to define an airgap therebetween, means for establishing a substantially radial magnetic field across said airgap, conductors carried by at least one of said elements for relative movement to cut the flux lines of said magnetic field, and means for establishing a second magnetic field directed substantially parallel to the axis of rotation of said rotor element and intersecting the radial magnetic field, whereby variation of said second magnetic field may be used to control the effective reluctance of said radial magnetic field.

2. In a dynamoelectric machine, a ring-shaped slotted magnetically permeable stator element, a winding in the slots of said stator element, a permanent magnet rotor mounted to rotate within said stator element and defining an airgap therebetween, said rotor being arranged to produce a radial rotating flux in said airgap cutting the winding in said slots, and a control winding in said stator element wound circumferentially to produce a control field extending axially of said stator element.

3. A dynamoelectric machine in accordance with claim 2, wherein said ring-shaped stator element comprises a base ring having said control winding positioned thereon and a plurality of spaced magnetically permeable yoke elements embracing said winding and secured to said base ring, said yoke elements with said base ring forming a closed flux path about said winding.

4. In combination, a dynamoelectric machine including a stator element, a rotor element mounted for rotation in said stator element and dimensioned to define an airgap therebetween, means for establishing a substantially radial magnetic field across said gap, conductors carried by at least one of said elements for relative movement to cut the flux of said field, a winding in said stator having the turns running circumferentially thereof and adapted to produce a substantially axially directed magnetic field in said stator element to control the effective reluctance of the flux in said airgap, and means for energizing said winding.

5. A dynamoelectric machine comprising a stator element, a rotor element mounted for rotation adjacent said stator element, and positioned to define an airgap therebetween, means for establishing a magnetic field flux across said airgap, conductors carried by at least one of said elements for relative movement to cut the flux lines of said magnetic field, and means for establishing a second magnetic field in one of the elements substantially at right angles to the main field flux in said element to thereby control the effective flux density in said airgap.

6. A dynamoelectric machine comprising a stator element, a rotor element mounted for rotation in said stator element and dimensioned to define an airgap therebetween, means for establishing a substantially radial magnetic field across said airgap, conductors carried by at least one of said elements for relative movement to cut the flux lines of said magnetic field, and means for establishing a second magnetic field directed substantially parallel to the axis of rotation of said rotor element and intersecting the radial magnetic field at right angles, the means for establishing said second field comprising a winding in said stator element, said winding lying in planes substantially perpendicular to the axis of said rotor element.

7. A dynamoelectric machine as set forth in claim 6 wherein said stator element comprises a ring of magnetically permeable material having said winding positioned therein, and a plurality of spaced magnetically permeable yokes embracing the turns of said winding with the legs thereof terminating at said stator ring.

8. A dynamoelectric machine as set forth in claim 6 wherein said stator element comprises a ring of magnetically permeable material having said winding positioned thereon and a plurality of spaced magnetically permeable yokes embracing the turns of said winding and terminating at said stator ring, the width of each yoke element measured circumferentially of the machine being less than the axial thickness of said stator element.

References Cited in the file of this patent

UNITED STATES PATENTS

| | | |
|---|---|---|
| 519,098 | Schmid et al. | May 1, 1894 |
| 705,238 | Hatch | July 22, 1902 |
| 1,736,618 | Nickle | Nov. 19, 1929 |
| 2,564,320 | Brainard | Aug. 14, 1951 |